No. 754,515. PATENTED MAR. 15, 1904.
J. M. TEAHEN.
STOP AND WASTE COCK.
APPLICATION FILED DEC. 29, 1902.
NO MODEL.
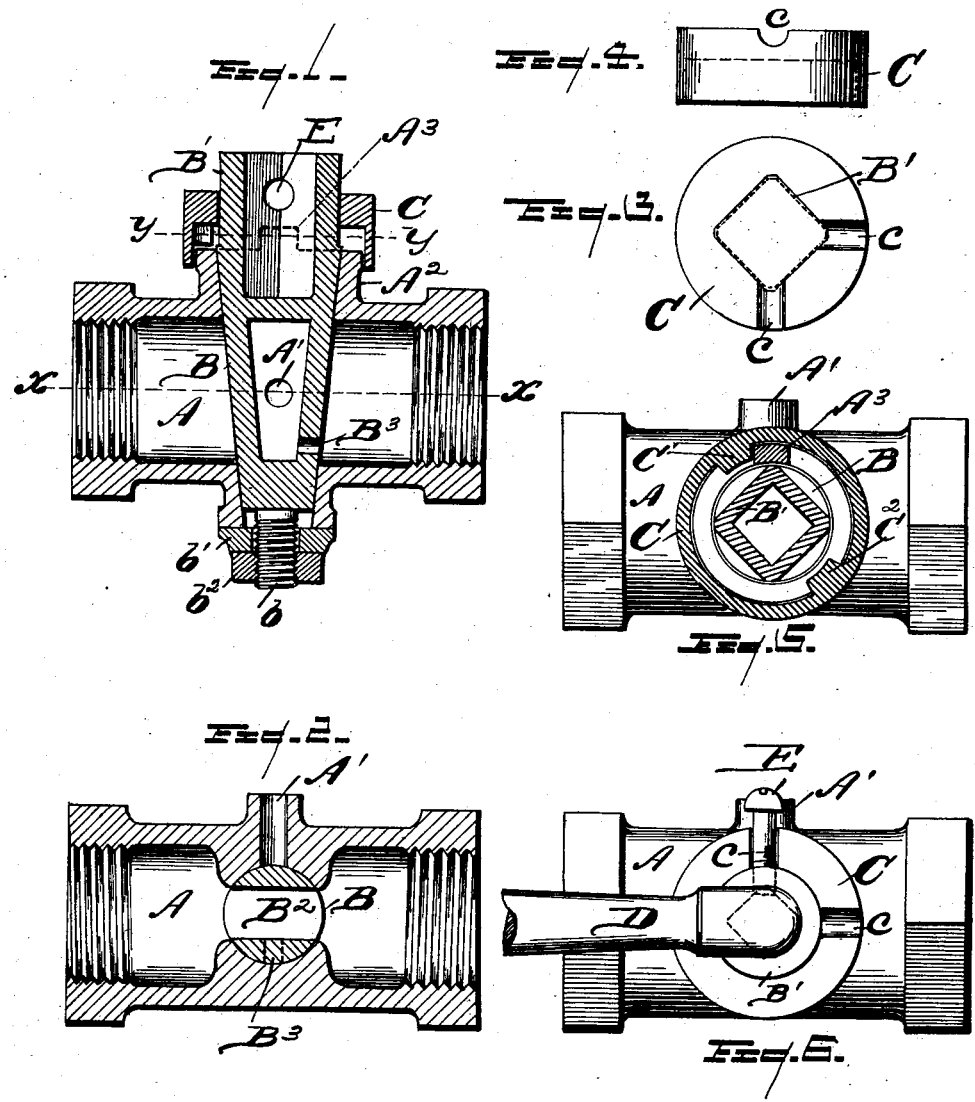

No. 754,515.

Patented March 15, 1904.

UNITED STATES PATENT OFFICE.

JAMES M. TEAHEN, OF DETROIT, MICHIGAN.

STOP AND WASTE COCK.

SPECIFICATION forming part of Letters Patent No. 754,515, dated March 15, 1904.

Application filed December 29, 1902. Serial No. 136,944. (No model.)

*To all whom it may concern:*

Be it known that I, JAMES M. TEAHEN, a citizen of the United States, residing at Detroit, county of Wayne, State of Michigan, have invented a certain new and useful Improvement in Stop and Waste Cocks; and I declare the following to be a full, clear, and exact description of the invention, such as will enable others skilled in the art to which it pertains to make and use the same, reference being had to the accompanying drawings, which form a part of this specification.

My invention relates to an improvement in stop and waste cocks, shown in the accompanying drawings and more particularly set forth in the following specification and claim.

In the drawings, Figure 1 is a vertical longitudinal sectional view through the valve and case. Fig. 2 is a horizontal sectional view on line X X of Fig. 1. Fig. 3 is a plan view of the cap. Fig. 4 is a side elevation of the same. Fig. 5 is a sectional view on line Y Y of Fig. 1. Fig. 6 is a plan view showing the shank on the valve or plug circular in cross-section in place of being square on the outside, as shown by dotted lines in Fig. 3.

The object of my invention is to provide a stop and waste cock, the construction being such as to protect the interior parts from the entry of dust, while providing suitable outside indicating means whereby the valve may be readily reversed to permit the drainage of water from either the left or right hand pipe, as required, without taking the valve apart; also, in other details of construction, which will hereinafter appear.

Referring to the letters of reference shown in the drawings, A is the valve-body; B, the plug or valve, provided with a shank B', projecting through an opening in the cap C, encircling the same. The plug B is provided with the usual screw-shank $b$, passing through an opening in the washer $b'$ and engaged by the nut $b^2$.

$B^2$ is the main port through the plug, and $B^3$ is an opening leading into the port $B^2$. When the plug is turned to close the passage of the water from the main, the water standing in the opposite pipe will drain through the ports $B^2$ and $B^3$ out through the opening A' in the valve-casing.

Cast on the rim of the annular collar $A^2$ is an upstanding lug $A^3$, designed to limit the rotation of the valve by serving as a stop for the lugs C' and $C^2$, formed on the inside of the cap C. The plug B is provided with a squared socket to receive the shank of the operating rod or handle D. In the top of the cap C are channels $c$ $c$, in which the screw E, engaging the shank B', lies. This screw passes through the shank and impinges upon the operating rod or handle B.

In Fig. 3 I have shown in dotted lines the shank B' squared on the outside and a like opening in the cap, through which the shank projects.

In Fig. 6 I show the shank B' circular on the outside in cross-section, the opening in the cap corresponding therewith.

When it is desired to reverse the position of the valve, so that it will be adapted to drain from the side opposite to that indicated by the drawings, it is only necessary to change the position of the cap C so that the lug $C^2$ will abut against the lug $A^3$. This can be done by either holding the plug stationary while the position of the cap is changed, or the cap may be held stationary and the plug rotated. To make this change, the screw E is removed and the position of the cap changed so that the other channel in the top of the cap registers with the screw-hole in the shank B'. The screw is then inserted, and the valve will then drain in the opposite direction. It will thus be seen that the channel in which the screw is lodged in will serve to indicate whether the right or left hand pipe is drained by the rotation of the valve. If the screw E is lodged in the right-hand channel when the valve is viewed from the drainage side, the left-hand pipe will be drained by the rotation of the valve, and vice versa.

If the shank of the plug B is squared, as indicated in Fig. 3, it will of course be necessary to remove the cap in order to change its position with relation to the valve.

The screw E serves a double purpose, as it fixes the cap C with relation to the plug and also engages the shank of the operating rod or handle in the plug-socket.

By providing open channels in the top of the cap C the cap can be rotated on the plug-shank and easily registered with the screw-hole in the shank, the lower wall of the channel protecting the working parts at all times from the entry of dust or dirt.

Having thus described my invention, what I claim is—

In a stop and waste cock, a body portion provided with an annular collar having an upstanding lug $A^3$, a valve provided with a hollow stem, said stem projecting above the annular collar and provided with an opening to receive a screw, a cap C sleeved on the valve-stem, its lower edge encircling the annular collar of the valve-body, said cap provided with channels in its upper wall to receive the projecting shank of a screw set in the valve-stem to lock the cap with the valve, lugs on the inside of the cap adapted to limit the rotation of the valve when brought in contact with the lug on the annular collar of the valve-body, means for rotating the valve secured in the hollow valve-stem, and a screw securing the valve-stem to the operating means, its projecting end lodged within one of the channels in the cap whereby it may indicate by its occupation of either channel, the pipe drained by the movement of the valve, substantially as described.

In testimony whereof I sign this specification in the presence of two witnesses.

JAMES M. TEAHEN.

Witnesses:
S. E. THOMAS,
C. H. FISK.